(12) United States Patent
Viscardi et al.

(10) Patent No.: US 9,509,243 B2
(45) Date of Patent: Nov. 29, 2016

(54) AUTOMATIC ACTUATOR CALIBRATION USING BACK EMF

(71) Applicant: Johnson Controls Technology Company, Holland, MI (US)

(72) Inventors: Claudio Viscardi, Milan (IT); Achim Reinders, Essen (DE)

(73) Assignee: Johnson Controls Technology Company, Plymouth, MI (US)

( * ) Notice: Subject to any disclaimer, the term of this patent is extended or adjusted under 35 U.S.C. 154(b) by 204 days.

(21) Appl. No.: 14/543,749

(22) Filed: Nov. 17, 2014

(65) Prior Publication Data

US 2016/0141985 A1    May 19, 2016

(51) Int. Cl.
*H02P 8/00* (2006.01)
*H02P 8/34* (2006.01)
*F16K 31/04* (2006.01)

(52) U.S. Cl.
CPC ............ *H02P 8/34* (2013.01); *F16K 31/041* (2013.01)

(58) Field of Classification Search
USPC .......... 318/696, 668, 400.34, 156, 520, 554
See application file for complete search history.

(56) References Cited

U.S. PATENT DOCUMENTS

| | | | |
|---|---|---|---|
| 5,657,664 A | 8/1997 | Birchmeier | |
| 5,758,684 A | 6/1998 | Hudson et al. | |
| 5,844,743 A | 12/1998 | Funches | |
| 5,852,333 A | 12/1998 | Strojny et al. | |
| 5,970,997 A | 10/1999 | Hudson et al. | |
| 5,988,319 A | 11/1999 | Hudson et al. | |
| 6,097,123 A | 8/2000 | Weiss et al. | |
| 6,198,243 B1 | 3/2001 | Ritmanich et al. | |
| 6,230,543 B1 | 5/2001 | Froehling et al. | |
| 6,265,843 B1 | 7/2001 | West et al. | |
| 6,690,536 B1 | 2/2004 | Ryan | |
| 6,717,765 B2 | 4/2004 | Harmer | |
| 6,795,268 B1 | 9/2004 | Ryan | |
| 6,954,324 B1 * | 10/2005 | Tu ........................ | G11B 19/20 360/73.01 |
| 8,294,400 B2 | 10/2012 | Harmer | |
| 2003/0184249 A1 * | 10/2003 | Heydt .................... | H02P 6/085 318/560 |
| 2012/0290136 A1 | 11/2012 | Romanowich et al. | |
| 2014/0001894 A1 | 1/2014 | Alexander et al. | |

OTHER PUBLICATIONS

U.S. Appl. No. 08/388,722, filed Feb. 15, 1995, Weiss et al.
U.S. Appl. No. 09/536,596, filed Mar. 28, 2000, Stier et al.
U.S. Appl. No. 14/475,141, filed Sep. 2, 2014, Johnson Controls Technology Company.

* cited by examiner

*Primary Examiner* — Eduardo Colon Santana
*Assistant Examiner* — Iftekhar Mustafa
(74) *Attorney, Agent, or Firm* — Foley & Lardner LLP

(57) ABSTRACT

A self-calibrating linear actuator is configured to control a spring return valve with variable stroke. The actuator includes a motor, a spindle coupled to an output of the motor, a motor controller coupled to the motor, a microcontroller coupled to the motor controller, and a back electromotive force (BEMF) circuit, coupled to the motor, configured to provide to the microcontroller a BEMF value for each motor step. The microcontroller is configured to determine a difference of a number of motor steps during operation of the actuator and to store the difference as a calibrated touch point for the actuator.

20 Claims, 9 Drawing Sheets

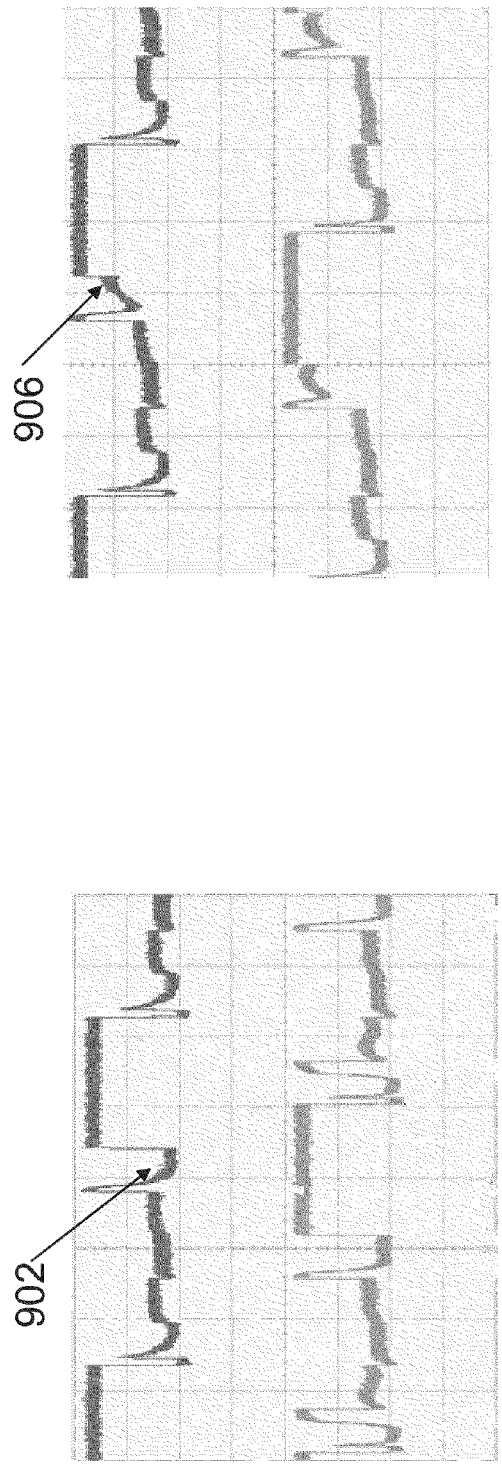

AUTOMATIC ACTUATOR CALIBRATION USING BACK EMF

BACKGROUND OF THE INVENTION

Field

Embodiments described herein generally relate to methods and devices for self-calibration of an actuator. More specifically, embodiments described herein relate to methods and devices for self-calibration of a linear actuator configured to control a spring return valve with variable stroke.

Background

Calibration of an actuator ensures proper operation and optimal performance. One approach is to use mechanical switches to detect stroke limits. Due to the mechanical contact, the accuracy, stability, and reliability of such systems may be significantly compromised. Furthermore, the mechanical switches take up additional space.

Another approach is to use resistors as current sensors for signal detection of motor power lines. However, due to variation in current flow, the accuracy and reliability of such sensor systems may be adversely affected. Furthermore, the sensing resistor results in poor system efficiency, resulting in using a larger actuator for the same application because the resistance must be large enough for sufficient signal sensing.

SUMMARY OF THE INVENTION

Embodiments described herein relate to a self-calibrating linear actuator configured to control a spring return valve with variable stroke, wherein the actuator comprises: a motor; a spindle coupled to an output of the motor; a motor controller coupled to the motor; a microcontroller coupled to the motor controller; a back electromotive force (BEMF) circuit, coupled to the motor, configured to provide to the microcontroller a BEMF value for each motor step, wherein the microcontroller is configured to cause the actuator to: drive the spindle downward for a first predetermined number of motor steps at power on; drive the spindle upward until upper stall point is reached, wherein the spindle is determined to have reached the upper stall point when the BEMF value is measured to be zero; drive the spindle downward from the upper stall point until stroke end stall point is reached, wherein the spindle is determined to have reached the stroke end stall point when the BEMF value is measured to be zero; drive the spindle upward from the stroke end stall point to the upper stall point, wherein the microcontroller is configured to count a first number of motor steps from the stroke end stall point to the upper stall point, and store the first number of motor steps; drive the spindle downward from the upper stall point for a second predetermined number of motor steps, wherein the microcontroller is configured to measure a BEMF value for each of the second predetermined number of motor steps, and calculate and store a mean average of the BEMF values for the second predetermined number of motor steps; drive the spindle downward beyond the second predetermined number of motor steps, wherein the microcontroller is configured to measure BEMF value for each motor step and count a second number of motor steps until touch point is reached, wherein the spindle is determined to have reached the touch point when the BEMF value is measured to be lower than the stored average BEMF value by a predetermined threshold; and wherein the microcontroller is configured to subtract the second predetermined number of motor steps and the second number of motor steps from the first number of motor steps, and store the difference of number of motor steps, wherein the difference of number of motor steps is calibrated touch point for the actuator.

In some embodiments, the motor is a reversible can stack stepper motor.

In some embodiments, the motor controller comprises a half-step MOSFET motor bridge.

In some embodiments, further comprising a force calibration circuit configured to control a potentiometer.

In some embodiments, further comprising an operational status circuit configured to indicate whether the motor is running.

In some embodiments, when the spindle is at the stroke end stall point, the valve is completely closed.

In some embodiments, when the spindle is at the stroke end stall point, the microcontroller is further configured to cause the actuator to drive the spindle downward for a predetermined duration.

In some embodiments, the predetermined duration is 20% of time required to cover an entire mechanical stroke.

In some embodiments, a number of motor steps needed to cover an entire mechanical stroke is the first number of motor steps.

In some embodiments, a number of motor steps needed to cover an electrical stroke is the difference of number of motor steps.

Embodiments described herein relate to a method for self-calibrating a linear actuator configured to control a spring return valve with variable stroke and comprising a motor, a spindle, a motor controller, a microcontroller, a back electromotive force (BEMF) circuit, the method comprising: driving the spindle downward for a first predetermined number of motor steps at power on; driving the spindle upward until upper stall point is reached, wherein the spindle is determined by the microcontroller to have reached the upper stall point when the BEMF value is measured by the microcontroller to be zero; driving the spindle downward from the upper stall point until stroke end stall point is reached, wherein the spindle is determined by the microcontroller to have reached the stroke end stall point when the BEMF value is measured by the microcontroller to be zero; driving the spindle upward from the stroke end stall point to the upper stall point while counting by the microcontroller a first number of motor steps, and storing by the microcontroller the first number of motor steps; driving the spindle downward from the upper stall point for a second predetermined number of motor steps, measuring by the microcontroller a BEMF value for each of the second predetermined number of motor steps, and storing by the microcontroller a mean average of the BEMF values for the second predetermined number of motor steps; driving the spindle downward beyond the second predetermined number of motor steps and measuring by the microcontroller BEMF value for each motor step while counting by the microcontroller a second number of motor steps until touch point is reached, wherein the spindle is determined by the microcontroller to have reached the touch point when the BEMF value is measured by the microcontroller to be lower than the stored average BEMF value by a predetermined threshold; subtracting by the microcontroller the second predetermined number of motor steps and the second number of motor steps from the first number of motor steps; and storing by the microcontroller the difference of number of motor steps as calibrated touch point of the actuator.

In some embodiments, the motor is a reversible can stack stepper motor.

In some embodiments, the motor controller comprises a half-step MOSFET motor bridge.

In some embodiments, further comprising a force calibration circuit configured to control a potentiometer.

In some embodiments, further comprising an operational status circuit configured to indicate whether the motor is running.

In some embodiments, when the spindle is at the stroke end stall point, the valve is completely closed.

In some embodiments, when the spindle is at the stroke end stall point, driving the spindle downward for a predetermined duration.

In some embodiments, the predetermined duration is 20% of time required to cover an entire mechanical stroke.

In some embodiments, a number of motor steps needed to cover an entire mechanical stroke is the first number of motor steps.

In some embodiments, a number of motor steps needed to cover an electrical stroke is the difference of number of motor steps.

BRIEF DESCRIPTION OF THE DRAWINGS

FIG. 9A is a waveform of BEMF during motor stall according to various embodiments.

FIG. 9B is a waveform of BEMF during motor running without load according to various embodiments.

FIG. 9C is a waveform of BEMF during motor running with load according to various embodiments.

DETAILED DESCRIPTION OF THE INVENTION

Self-calibration allows an actuator to be suitable for any valve with variable stroke, covering most conventional terminal units and Pressure Independent Control Valves (PICVs). By reading back electromotive force (BEMF) generated by the motor using an electrical circuit in the actuator, this approach avoids any additional external components, saving manufacturing costs and improving accuracy of a calibrated touch point, where a touch point is the spindle position where the spindle first contacts a valve stem. Because BEMF is a physical consequence of running a motor, utilizing this inherent aspect of a motor provides low cost calibration, without requiring additional external sensors. BEMF generated by a motor is measured in order to detect motor stall, touching point, and free rotation, and as a consequence the stroke of a valve and thus calibrated touch point are determined automatically.

Figure 1:
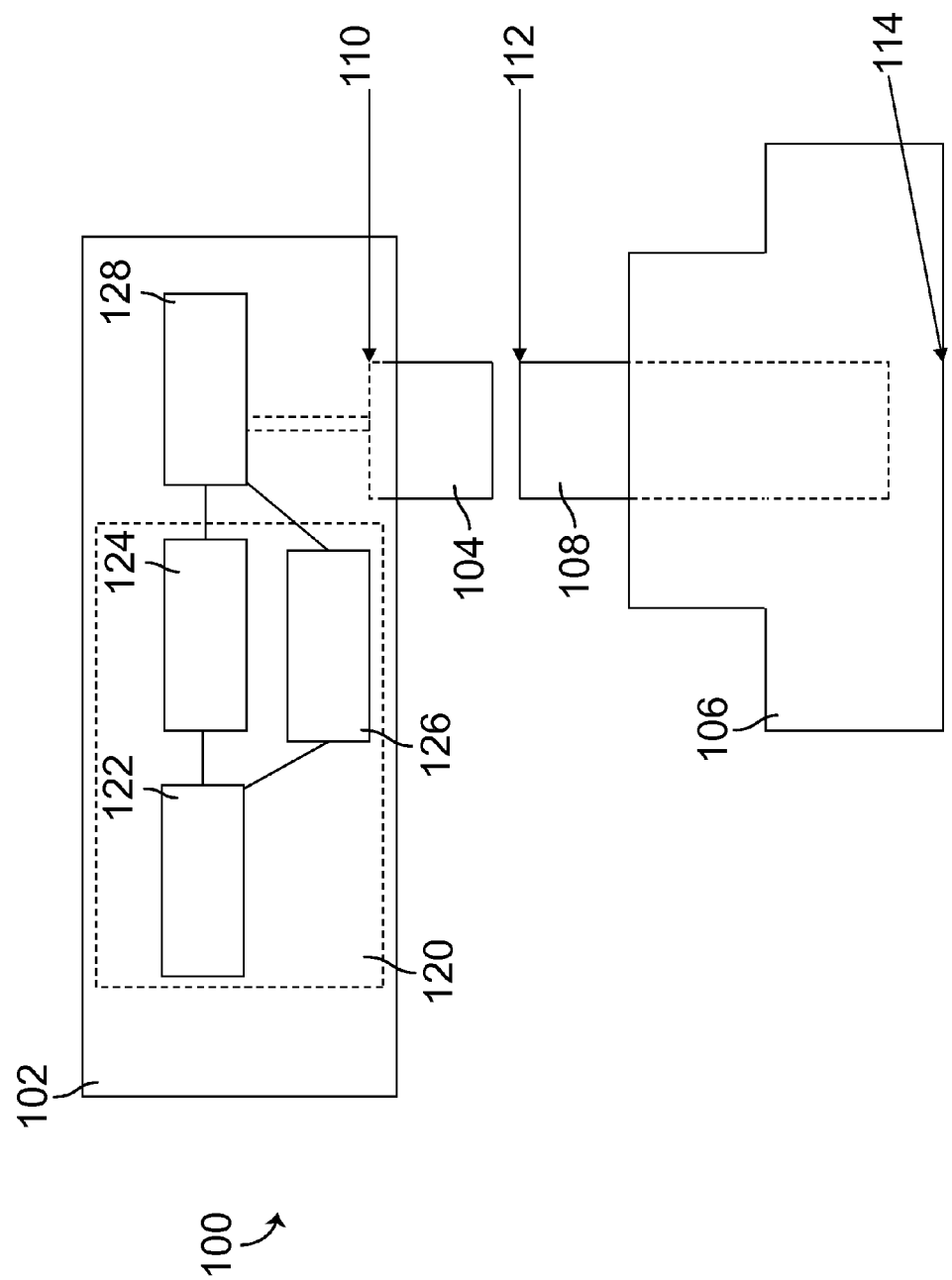
FIG. 1 is a schematic diagram illustrating a system according to various embodiments.

With reference to FIG. 1, a schematic diagram of a system 100 is shown, according to an exemplary embodiment. Actuator 102 comprises an electric system 120, a motor 128, and a spindle 104. In embodiments, electric system 120 comprises a microcontroller 122, a motor controller 124, and a BEMF circuit 126. Electric system 120 is coupled to motor 128. In some embodiments, motor 128 is a reversible can stack stepper motor. Output of motor 128 is coupled to spindle 104. Actuator 102 is configured to control, via spindle 104, a valve 106 with valve stem 108. In embodiments, upper stall point 110 indicates the position of the spindle 104 at the top of a stroke when BEMF value of the motor 128 is zero. In embodiments, calibrated touch point 112 indicates the position of the spindle 104 when BEMF value of the motor 128 indicates the spindle 104 first contacts valve stem 108. In embodiments, stroke end stall point 114 indicates the position of the spindle 104 at the end of a stroke when BEMF value of the motor 128 is zero.

Figure 2:
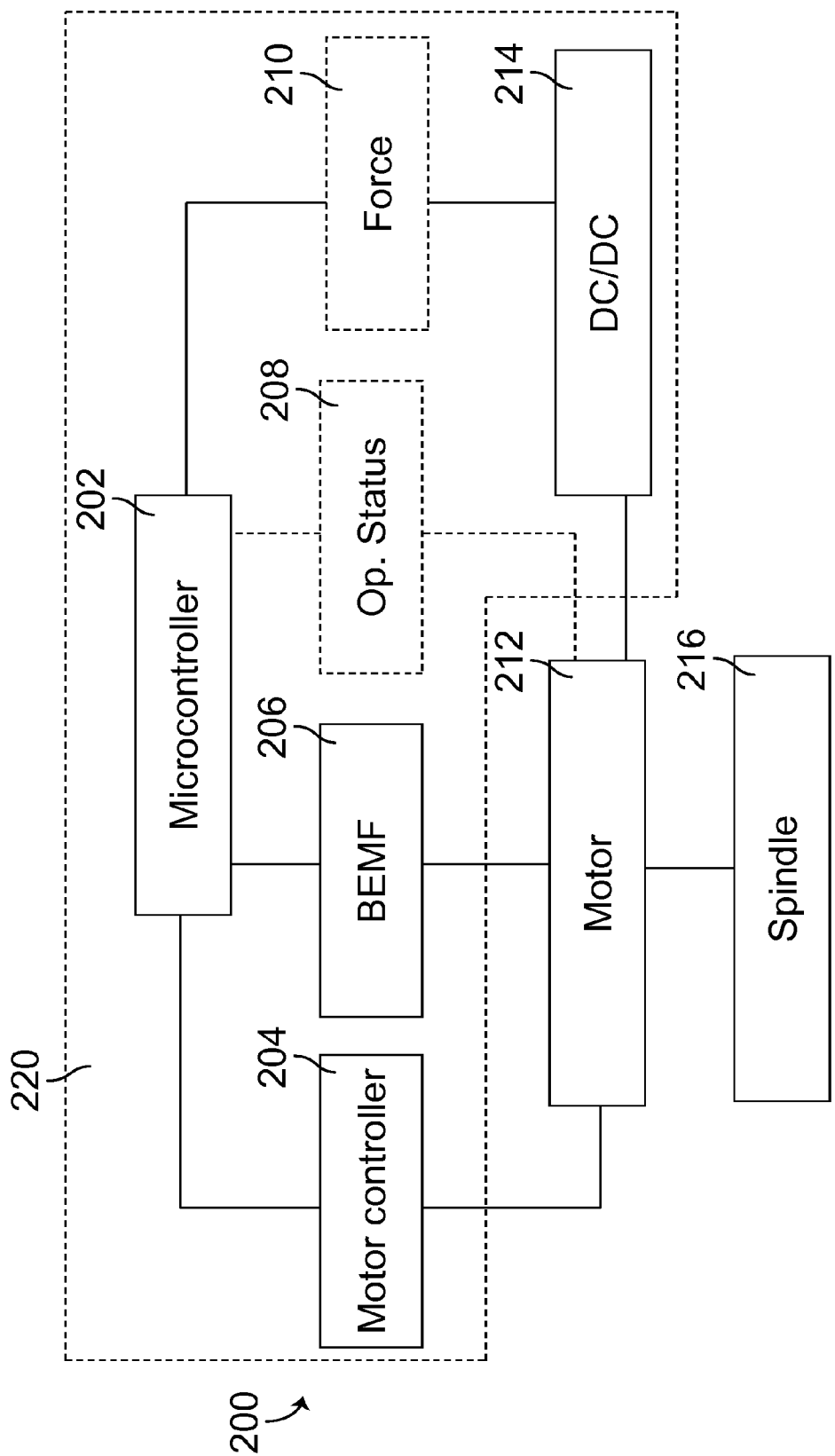
FIG. 2 is a functional block diagram illustrating an actuator according to various embodiments.

Referring now to FIG. 2, a functional block diagram of an actuator 200 including an electric system 220, motor 212, and spindle 216 is shown, according to various embodiments. In embodiments, electric system 220 comprises a microcontroller 202, a motor controller 204, a BEMF circuit 206, and a DC/DC converter circuit 214. Microcontroller 202 is coupled to motor controller 204 and BEMF circuit 206. Motor controller 204 is coupled to motor 212. BEMF circuit 206 is coupled to motor 212. In some embodiments, electric system 220 further comprises an operational status circuit 208 coupled to microcontroller 202 and motor 212 and configured to indicate whether motor 212 is running. In some embodiments, electric system 220 further comprises a force calibration circuit 210 coupled to microcontroller 202 and DC/DC converter circuit 214 and configured to control a potentiometer.

Figure 3:
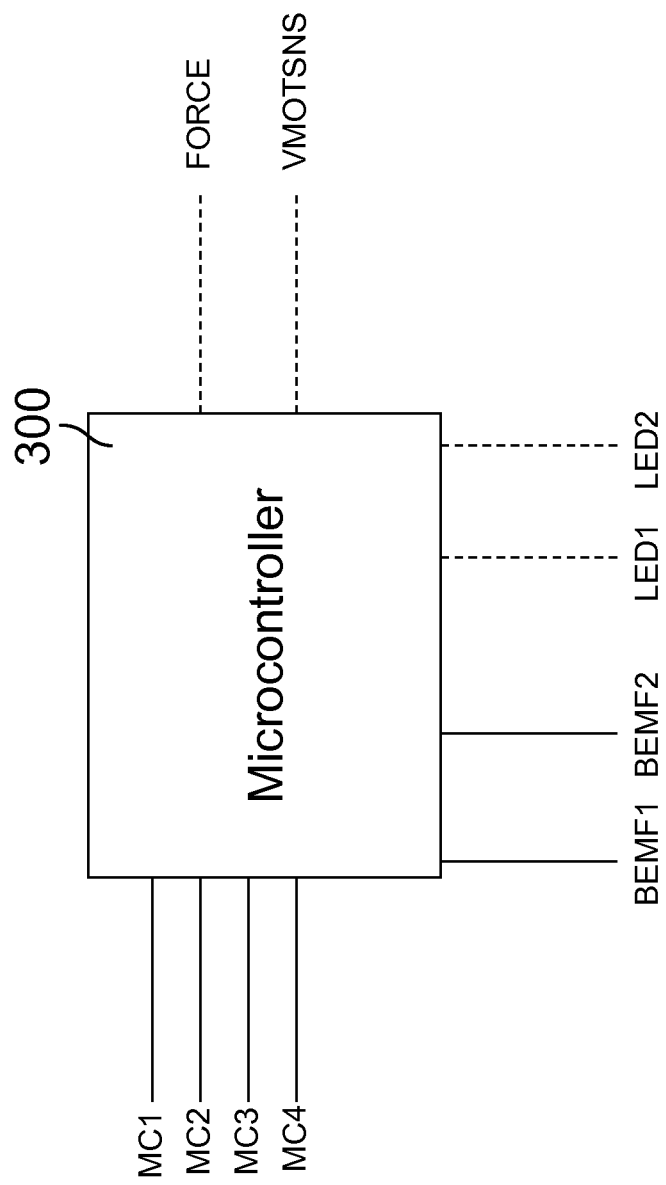
FIG. 3 is a functional block diagram illustrating a microcontroller according to various embodiments.

Referring now to FIG. 3, a functional block diagram of a microcontroller 300 is shown, according to various embodiments. In embodiments, microcontroller 300 is configured to transmit motor control signals MC1, MC2, MC3, and MC4 to a motor controller. In embodiments, microcontroller 300 is configured to receive BEMF circuit signals BEMF1 and BEMF2 from a BEMF circuit. In some embodiments, microcontroller is configured to transmit operational status signals LED1 and LED2 to an operational status circuit. In some embodiments, microcontroller 300 is configured to transmit force calibration signal FORCE to and receive force calibration signal VMOTSNS from a force calibration circuit. In some embodiments, microcontroller 300 may be configured to perform a variety of operations. In some embodiments, microcontroller 300 may be a microprocessor.

Figure 4:
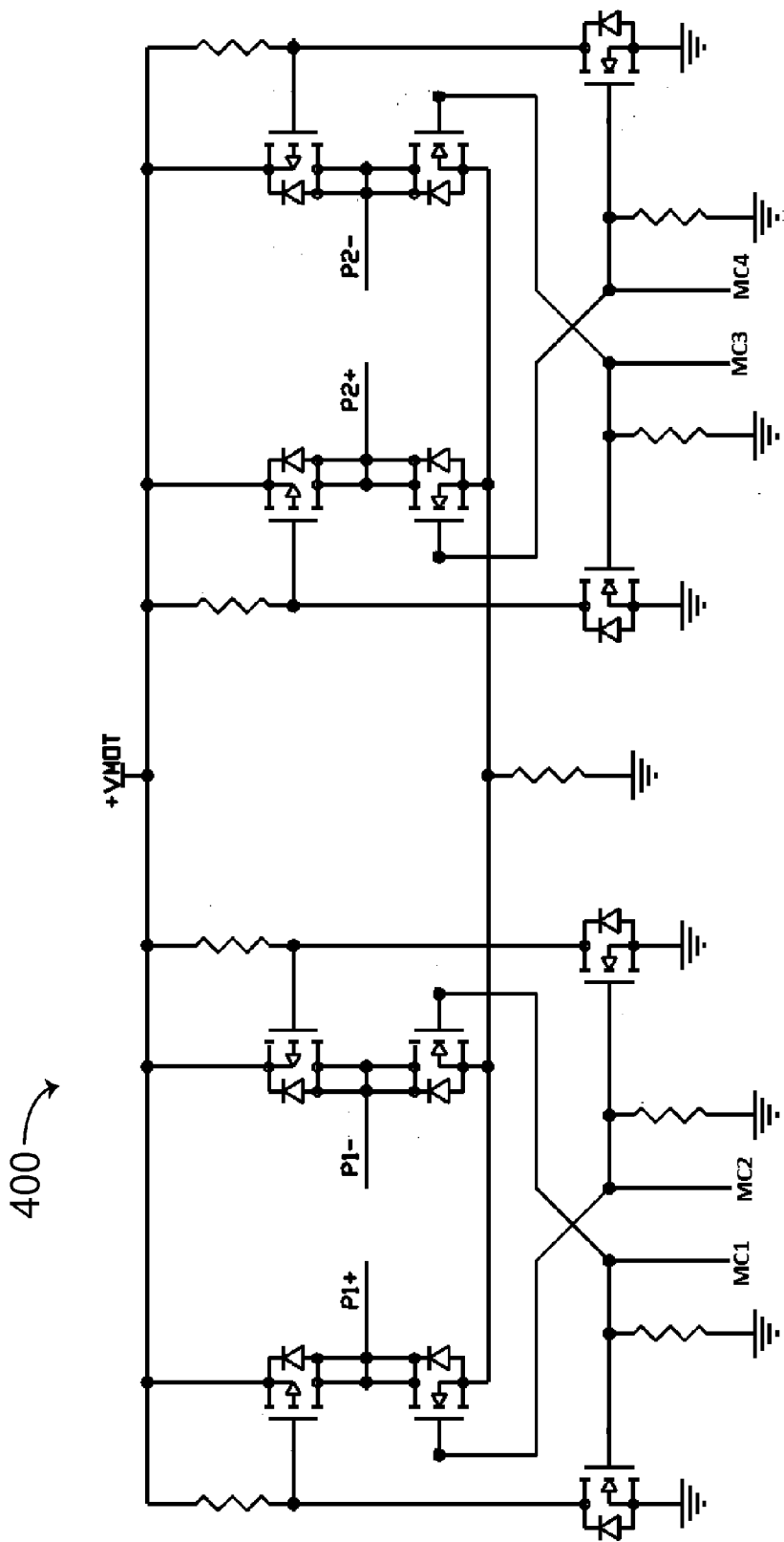
FIG. 4 is a circuit diagram of a motor controller according to various embodiments.

Referring now to FIG. 4, a circuit diagram of a motor controller 400 is shown, according to various embodiments. In embodiments, the motor controller 400 comprises a half-step MOSFET motor bridge. A motor is positioned so that motor windings are touching points P1+, P1−, P2+, and P2−. In embodiments, motor control signals MC1, MC2, MC3, and MC4 from a microcontroller control which MOSFETs are on, and thus whether the motor windings are connected to the power supply. In embodiments, using motor controller 400, the motor windings may be disconnected from the power supply, resulting in floating windings, which allows for measuring by a microcontroller via a BEMF circuit BEMF values from the motor. The motor is driven in half step mode. During a half step period, the MOSFETS are all off, the motor windings are floating, and thus the BEMF value may be measured.

Figure 5:
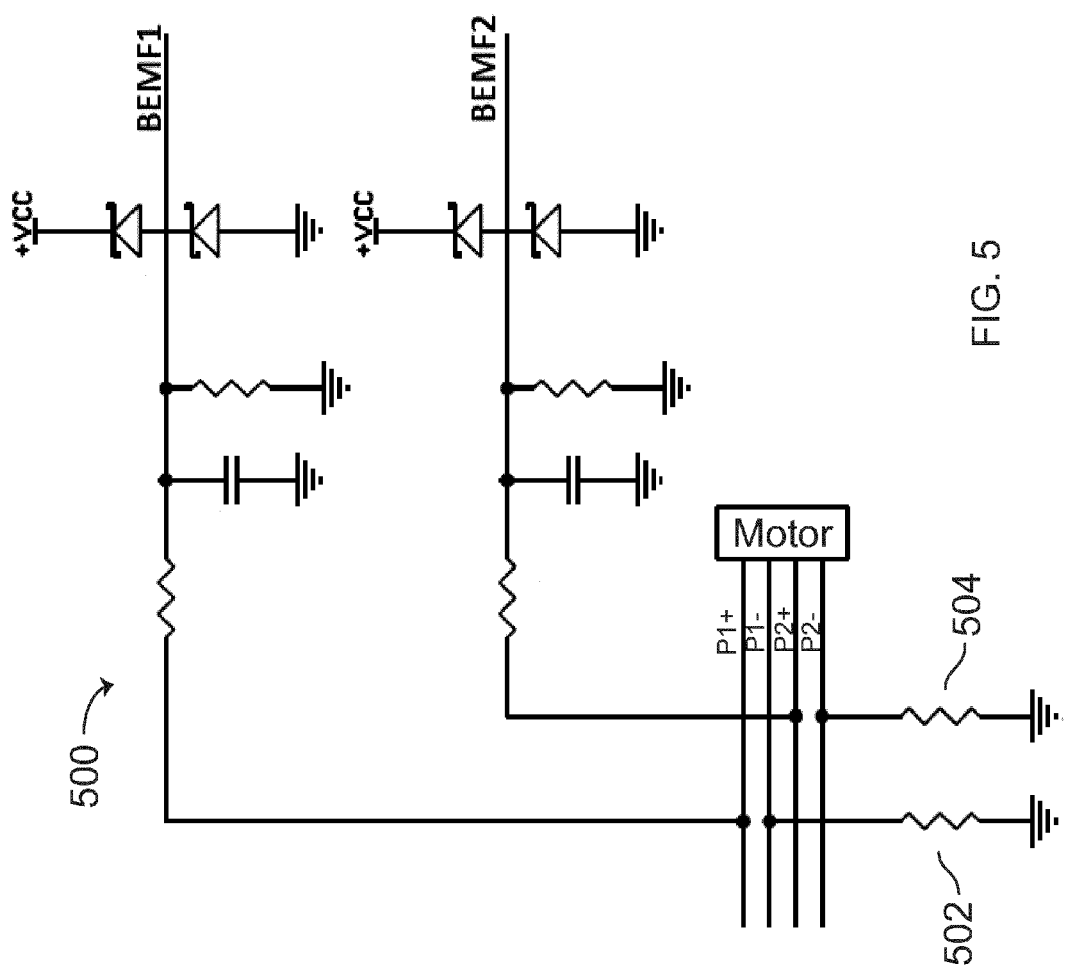
FIG. 5 is a circuit diagram of a back electromotive force (BEMF) circuit according to various embodiments.

Referring now to FIG. 5, a circuit diagram of a BEMF circuit 500 is shown, according to various embodiments.

BEMF is dependent on motor speed and when a motor is under load, there is speed variation, and consequently torque variation. This allows determination of whether the motor is running without a load, is in stall, or running with a load. Load on the motor appears as a change in the torque of the motor and BEMF values when a motor is loaded are different from BEMF values when a motor is not loaded or is in stall. In embodiments, BEMF circuit signals BEMF1 and BEMF2 are BEMF values from the motor windings, with one winding measured across P1+ and P1−, and another winding measured across P2+ and P2−. Measuring BEMF value of a motor requires a closed circuit. In embodiments, impedances 502 and 504 are used to connect one side of each winding to ground when, in the half step period, the MOSFETs are completely open. BEMF values of the motor when the motor is in stall, running without a load, and running with a load are discussed with respect to FIGS. 9A-9C.

Figure 6:
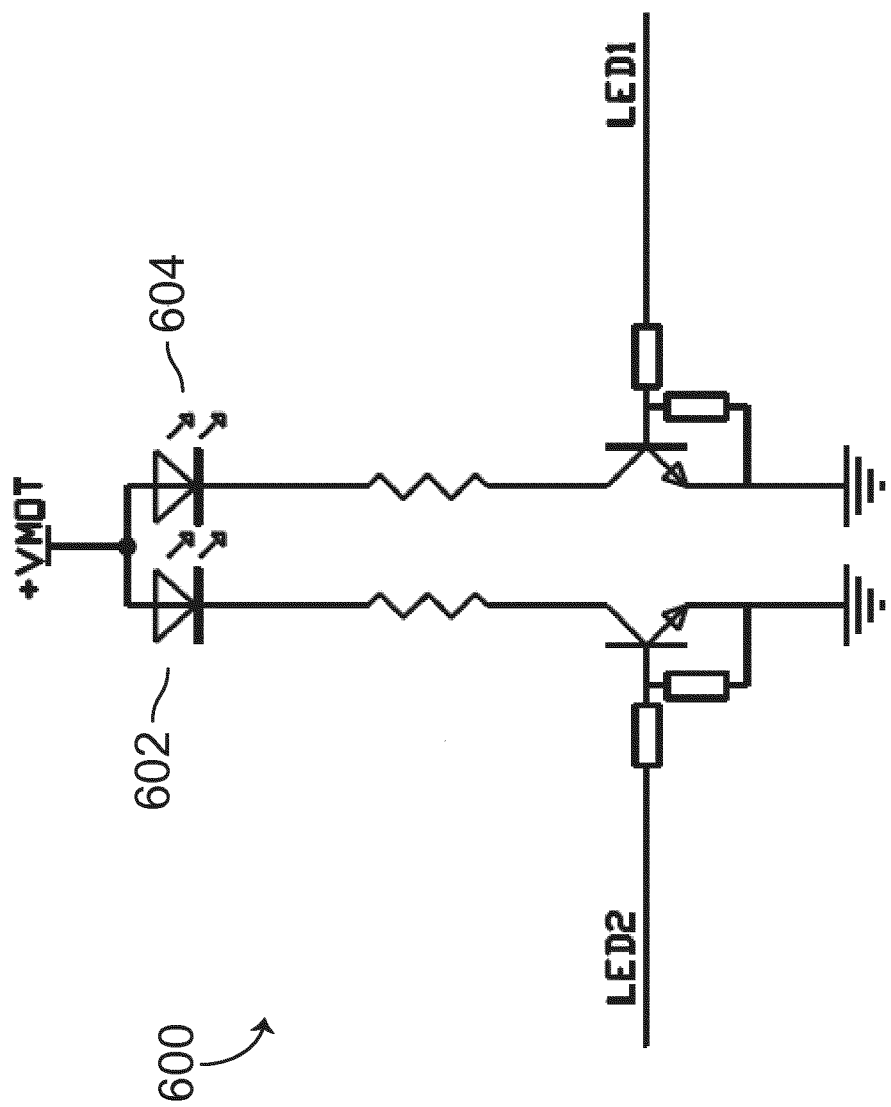
FIG. 6 is a circuit diagram of an operational status circuit according to various embodiments.

Referring now to FIG. 6, a circuit diagram of an operational status circuit 700 is shown, according to various embodiments. In some embodiments, operational status circuit 700 is configured to indicate whether a motor is running or off. In some embodiments, when the motor is off, VMOT is zero, and thus LEDs 602 and 604 are off. In some embodiments, when the motor is on, operational status signals LED1 and LED2 control whether one or both of LEDs 602 and 604 are on. In some embodiments, one LED may be on while the motor is on and driving the spindle into position. In some embodiments, both LEDs may be on while the motor is on and the spindle has reached the desired position. In some embodiments, whether the LEDs are on may indicate calibration process at power on. In some embodiments, whether the LEDs are on may indicate whether there is a failure or error. In some embodiments, LEDs 602 and 604 may emit different colors.

Figure 7:
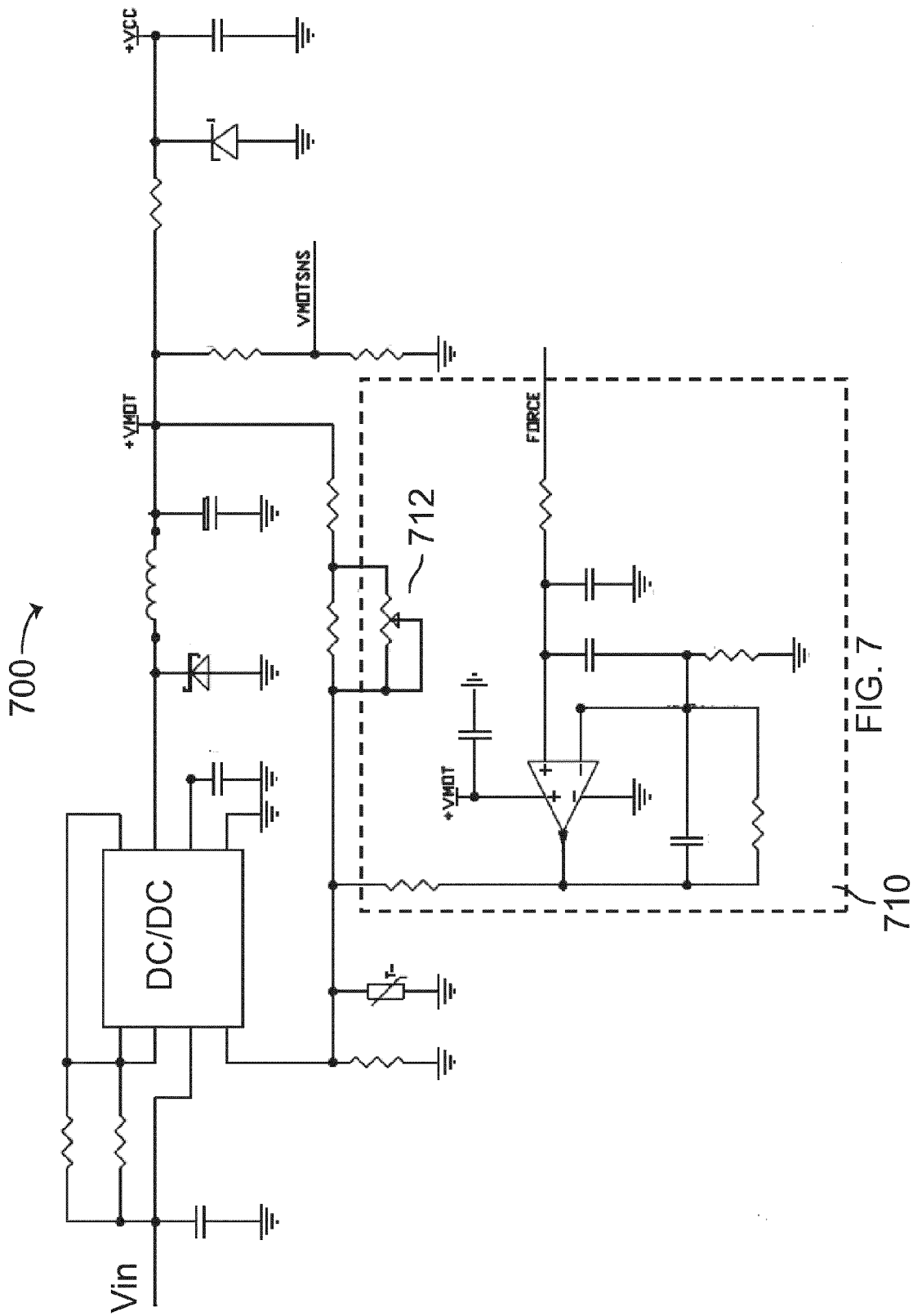
FIG. 7 is circuit diagrams of a DC/DC converter circuit and a force calibration circuit according to various embodiments.

Referring now to FIG. 7, circuit diagrams of a DC/DC converter circuit 700 and a force calibration circuit 710 are shown, according to various embodiments. In embodiments, DC/DC converter circuit 700 is configured to convert input voltage Vin into voltage VMOT to power the motor and voltage VCC to power the microcontroller. In some embodiments, a force calibration circuit 710 is coupled to the DC/DC converter circuit 700. In some embodiments, the microcontroller receives force calibration signal VMOTSNS from DC/DC converter circuit 700 and is configured to transmit force calibration signal FORCE to force calibration circuit 710, which is configured to control potentiometer 712. In some embodiments, by controlling potentiometer 712, the voltages VMOT and VCC may be adjusted. In some embodiments, using force calibration circuit 710 avoids using a traditional potentiometer requiring external adjustment. This allows saving time in production and controlling the motor power. Controlling the motor power also increase the sensitivity of the system; with less power, smaller changes in torque/motor load may be detected, thus improving the self-calibration process.

Figure 8:
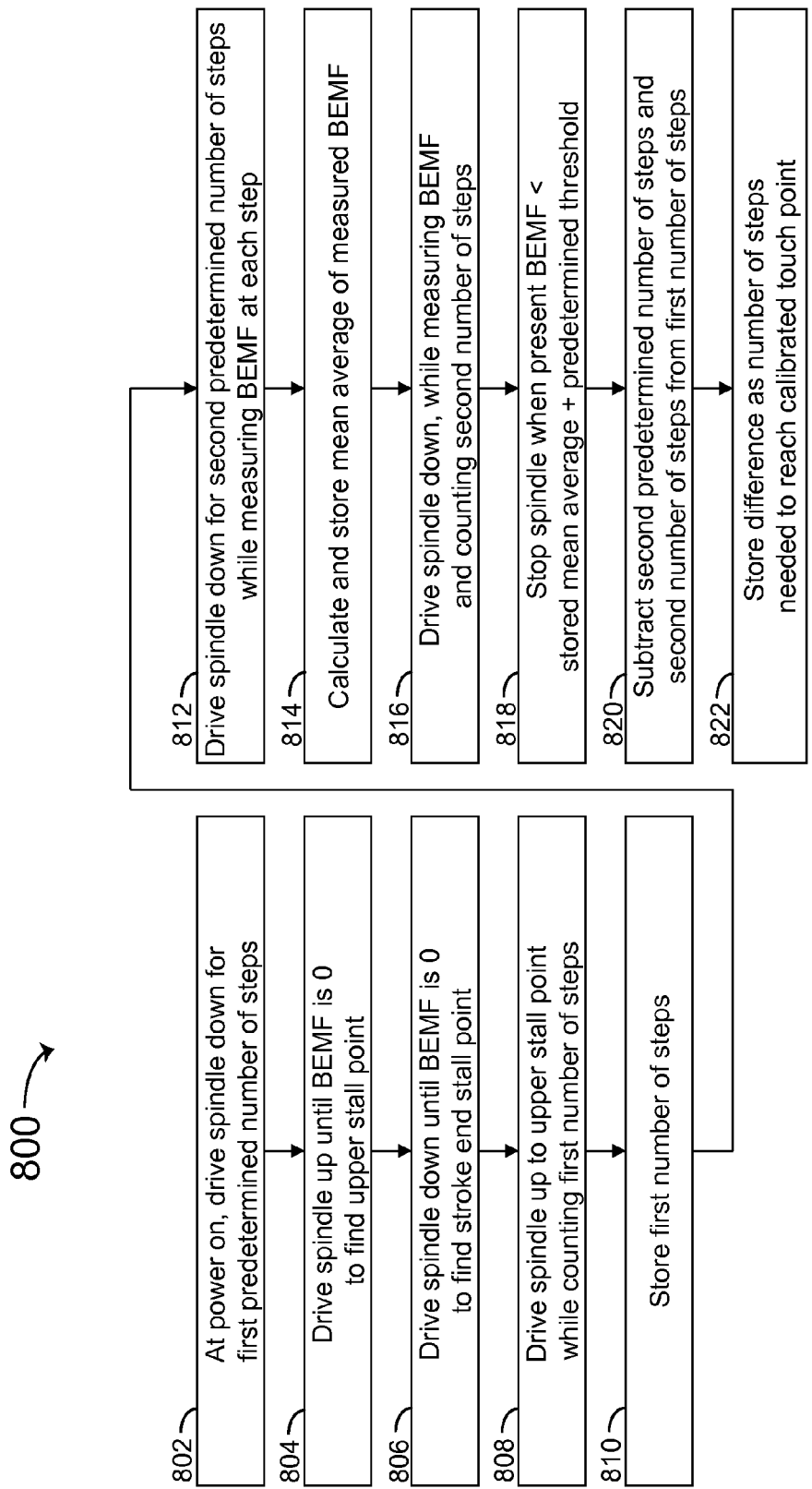
FIG. 8 is a process flowchart illustrating an example of self-calibration of an actuator according to various embodiments.

Referring now to FIG. 8, a process flowchart 800 for a method of self-calibrating an actuator comprising a motor, a spindle, a motor controller, a microcontroller, and a BEMF circuit and configured to control a valve is shown, according to various embodiments. In embodiments, the spindle is driven downward for a first predetermined number of motor steps at power on (802). In some embodiments, the first predetermined number of motor steps may be a number of motor steps sufficient to rotate the motor ten revolutions. In some embodiments, the first predetermined number of motor steps may be a number of motor steps sufficient to drive the spindle downward 1 millimeter.

In embodiments, the spindle is driven upward until an upper stall point is reached, wherein the spindle is determined by the microcontroller to have reached the upper stall point when the BEMF value provided by the BEMF circuit is measured by the microcontroller to be zero (804). See FIG. 9A. In embodiments, the spindle is driven downward from the upper stall point until a stroke end stall point is reached, wherein the spindle is determined by the microcontroller to have reached the stroke end stall point when the BEMF value provided by the BEMF circuit is measured by the microcontroller to be zero (806). See FIG. 9A. In some embodiments, when the spindle is at the stroke end stall point, the valve is completely closed. In some embodiments, when the spindle is at the stroke end stall point, the microcontroller is configured to cause the actuator to drive the spindle downward for an additional predetermined duration. In some embodiments, the predetermined duration is 20% of the time required to cover an entire mechanical stroke, for a total downward duration of 120%.

In embodiments, the spindle is driven upward from the stroke end stall point to the upper stall point while counting by the microcontroller a first number of motor steps (808), and storing by the microcontroller the first number of motor steps (810). In some embodiments, a number of motor steps needed to cover an entire mechanical stroke is the first number of motor steps.

In embodiments, the spindle is driven downward from the upper stall point for a second predetermined number of motor steps, a BEMF value provided by the BEMF circuit measured by the microcontroller for each of the second predetermined number of motor steps (812), and a mean average of the BEMF values for the second predetermined number of motor steps is calculated and stored by the microcontroller (814). See FIG. 9B. In some embodiments, the second predetermined number of motor steps may be 500 steps.

In embodiments, the spindle is driven downward beyond the second predetermined number of motor steps and BEMF value provided by the BEMF circuit is measured by the microcontroller for each motor step while a second number of motor steps is counted by the microcontroller (816) until a touch point is reached, wherein the spindle is determined by the microcontroller to have reached the touch point when the BEMF value measured by the microcontroller is less than the stored average BEMF value plus a predetermined threshold (818). See FIG. 9C. In some embodiments, the predetermined threshold is zero. The touch point would be the first BEMF value less than the stored average BEMF value. The touch point is the spindle position where the spindle first contacts the valve stem.

In embodiments, the second predetermined number of motor steps and the second number of motor steps are subtracted by the microcontroller from the first number of motor steps (820), and the difference of number of motor steps is stored by the microcontroller as calibrated touch point of the actuator (822). In some embodiments, a number of motor steps needed to cover an electrical stroke is the difference of number of motor steps.

Referring now to FIG. 9A, a waveform of BEMF during motor stall is shown, according to various embodiments. In embodiments, BEMF value 902 provided by BEMF circuit to a microcontroller is zero while the motor is in stall when a motor controller disconnects the motor windings from the power supply.

Referring now to FIG. 9B, a waveform of BEMF during motor running without a load is shown, according to various embodiments. In embodiments, BEMF value 904 provided by BEMF circuit to a microcontroller while the motor is running without a load is used to determine whether a touch point is reached.

Referring now to FIG. 9C, a waveform of BEMF during motor running with a load is shown, according to various embodiments. In embodiments, BEMF value 906 provided by BEMF circuit to a microcontroller while the motor is running with a load indicates that the spindle is touching the valve stem, and the valve stem thus is a load to be driven by the motor. Because the motor is now driving a load, the BEMF value 906 is different from the BEMF value 904. By detecting when BEMF 906 first occurs, the self-calibration process determines where the valve stem is located, and thus the touch point to where the actuator should be calibrated.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A self-calibrating linear actuator configured to control a spring return valve with variable stroke, wherein the actuator comprises:
   a motor;
   a spindle coupled to an output of the motor;
   a motor controller coupled to the motor;
   a microcontroller coupled to the motor controller;
   a back electromotive force (BEMF) circuit, coupled to the motor, configured to provide to the microcontroller a BEMF value for each motor step,
   wherein the microcontroller is configured to cause the actuator to:
      drive the spindle downward for a first predetermined number of motor steps at power on;
      drive the spindle upward until upper stall point is reached, wherein the spindle is determined to have reached the upper stall point when the BEMF value is measured to be zero;
      drive the spindle downward from the upper stall point until stroke end stall point is reached, wherein the spindle is determined to have reached the stroke end stall point when the BEMF value is measured to be zero;
      drive the spindle upward from the stroke end stall point to the upper stall point, wherein the microcontroller is configured to count a first number of motor steps from the stroke end stall point to the upper stall point, and store the first number of motor steps;
      drive the spindle downward from the upper stall point for a second predetermined number of motor steps, wherein the microcontroller is configured to measure a BEMF value for each of the second predetermined number of motor steps, and calculate and store a mean average of the BEMF values for the second predetermined number of motor steps;
      drive the spindle downward beyond the second predetermined number of motor steps, wherein the microcontroller is configured to measure BEMF value for each motor step and count a second number of motor steps until touch point is reached, wherein the spindle is determined to have reached the touch point when the BEMF value is measured to be lower than the stored average BEMF value by a predetermined threshold; and
   wherein the microcontroller is configured to subtract the second predetermined number of motor steps and the second number of motor steps from the first number of motor steps, and store the difference of number of motor steps,
   wherein the difference of number of motor steps is calibrated touch point for the actuator.

2. The actuator of claim 1, wherein the motor is a reversible can stack stepper motor.

3. The actuator of claim 1, wherein the motor controller comprises a half-step MOSFET motor bridge.

4. The actuator of claim 1, further comprising a force calibration circuit configured to control a potentiometer.

5. The actuator of claim 1, further comprising an operational status circuit configured to indicate whether the motor is running.

6. The actuator of claim 1, wherein when the spindle is at the stroke end stall point, the valve is completely closed.

7. The actuator of claim 1, wherein when the spindle is at the stroke end stall point, the microcontroller is further configured to cause the actuator to drive the spindle downward for a predetermined duration.

8. The actuator of claim 7, wherein the predetermined duration is 20% of time required to cover an entire mechanical stroke.

9. The actuator of claim 1, wherein a number of motor steps needed to cover an entire mechanical stroke is the first number of motor steps.

10. The actuator of claim 1, wherein a number of motor steps needed to cover an electrical stroke is the difference of number of motor steps.

11. A method for self-calibrating a linear actuator configured to control a spring return valve with variable stroke and comprising a motor, a spindle, a motor controller, a microcontroller, a back electromotive force (BEMF) circuit, the method comprising:
   driving the spindle downward for a first predetermined number of motor steps at power on;
   driving the spindle upward until upper stall point is reached, wherein the spindle is determined by the microcontroller to have reached the upper stall point when the BEMF value is measured by the microcontroller to be zero;
   driving the spindle downward from the upper stall point until stroke end stall point is reached, wherein the spindle is determined by the microcontroller to have reached the stroke end stall point when the BEMF value is measured by the microcontroller to be zero;
   driving the spindle upward from the stroke end stall point to the upper stall point while counting by the microcontroller a first number of motor steps, and storing by the microcontroller the first number of motor steps;
   driving the spindle downward from the upper stall point for a second predetermined number of motor steps, measuring by the microcontroller a BEMF value for each of the second predetermined number of motor steps, and storing by the microcontroller a mean average of the BEMF values for the second predetermined number of motor steps;
   driving the spindle downward beyond the second predetermined number of motor steps and measuring by the microcontroller BEMF value for each motor step while counting by the microcontroller a second number of motor steps until touch point is reached, wherein the spindle is determined by the microcontroller to have reached the touch point when the BEMF value is measured by the microcontroller to be lower than the stored average BEMF value by a predetermined threshold;
   subtracting by the microcontroller the second predetermined number of motor steps and the second number of motor steps from the first number of motor steps; and
   storing by the microcontroller the difference of number of motor steps as calibrated touch point of the actuator.

12. The method of claim 11, wherein the motor is a reversible can stack stepper motor.

13. The method of claim 11, wherein the motor controller comprises a half-step MOSFET motor bridge.

14. The method of claim 11, further comprising a force calibration circuit configured to control a potentiometer.

15. The method of claim 11, further comprising an operational status circuit configured to indicate whether the motor is running.

16. The method of claim 11, wherein when the spindle is at the stroke end stall point, the valve is completely closed.

17. The method of claim 11, wherein when the spindle is at the stroke end stall point, driving the spindle downward for a predetermined duration.

18. The method of claim 17, wherein the predetermined duration is 20% of time required to cover an entire mechanical stroke.

19. The method of claim 11, wherein a number of motor steps needed to cover an entire mechanical stroke is the first number of motor steps.

20. The method of claim 11, wherein a number of motor steps needed to cover an electrical stroke is the difference of number of motor steps.

* * * * *